United States Patent [19]

Kennell et al.

[11] 4,388,424

[45] Jun. 14, 1983

[54] CAULK CONTAINING MICROBALLOONS

[75] Inventors: Samuel C. Kennell, Chesterland; Ronald F. Witkiewicz, Garfield Hts., both of Ohio

[73] Assignee: SCM Corporation, New York, N.Y.

[21] Appl. No.: 318,472

[22] Filed: Nov. 5, 1981

[51] Int. Cl.³ ............................................. C08J 9/32
[52] U.S. Cl. .................................. 523/219; 524/560; 524/561; 524/562
[58] Field of Search ................................ 523/219, 494

[56] References Cited

U.S. PATENT DOCUMENTS

| | | | |
|---|---|---|---|
| 2,824,502 | 2/1958 | Rockwell et al. | 94/22 |
| 3,230,184 | 1/1966 | Alford | 260/2.5 |
| 3,314,838 | 4/1967 | Erwin | 156/71 |
| 3,873,475 | 3/1975 | Pechacek et al. | 260/2.5 B |

*Primary Examiner*—Joseph L. Schofer
*Assistant Examiner*—Bernard Lipman
*Attorney, Agent, or Firm*—Thomas M. Schmitz

[57] ABSTRACT

A lightweight extrudible or trowellable caulk or sealant composition can be compounded from polymeric acrylic binders containing dispersed therein sufficient microballoons with minor amounts of the ingredients to provide a pliable caulk material exhibiting good heat insulation properties, low shrinkage, and flexability in use.

2 Claims, No Drawings

CAULK CONTAINING MICROBALLOONS

BACKGROUND OF THE INVENTION

Caulks ordinarily contain colored pigments and mineral fillers dispersed uniformly in a binder to provide a putty-like mastic which can be extruded or trowlled into place. The pliable caulk material is ordinarily applied to a joint to be sealed and hardens at ambient application temperatures to form a resilient continuous barrier between the structural elements to be sealed. The cured or set caulk barrier effectively seals against moisture and air penetration as well as similar liquids and gases. The hardened caulk material desirably exhibits contraction or expansion properties over a long period of time without breaking the continuous sealing barrier. Caulks desirably exhibit useful barrier properties such as elongation, good recovery, low modules, and good adhesion to adjacent substrates.

Acrylic polymers are known to be useful binders for caulk materials and can comprise solvent or water dispersed thermoplastic polyacrylic copolymer. Water dispersed acrylic latex binders are known to provide flexibility, low shrinkage, good adhesion, freeze-thaw stability, and water resistance.

It now has been found that a particularly effective lightweight caulk material can be compounded based on acrylic copolymer latex binders in combination with major amounts of glass microballoon fillers having an average particle size less than about 130 microns or about 90% by weight passing 80 mesh screen size. The resulting low-density caulk material has density of about 4-6 pounds per gallon as compared to conventional caulk materials which typically exhibit 12-13 pounds per gallon. In use, the caulk materials of this invention set to form a high density resilient impermeable barrier exhibiting substantially increased heat and cold insulating properties as well as no appreciably shrinkage. These and other advantages of this invention will become more apparent by referring to the detailed description of the invention.

SUMMARY OF THE INVENTION

The lightweight caulk material of this invention comprises on a dry solid weight basis between about 40% to 75% acrylic copolymer latex binder and between about 25% to 60% glass microballoons, as well as minor amounts of other compound additives such as plasticizer, solvent, water, adhesion promoters, and if desired, mineral filler or coloring pigments.

DETAILED DESCRIPTION OF THE INVENTION

The caulk material of this invention comprises acrylic copolymer latex binder compounded predominantly with glass microballoons along with minor amounts of compounding ingredients ordinarily used in caulking products.

The acrylic binder can have an acrylic copolymer containing by weight at least about 30% copolymerized acrylic unsaturated monomers preferably copolymerized with other ethylenically unsaturated monomers. Acrylic unsaturated monomers include lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids, hydroxy alkyl acrylates and methacrylates such as hydroxyethyl and hydroxypropyl acrylates and methacrylates, as well as amino acrylates and methacrylates. The acrylic monomers are preferably copolymerized with ethylenically unsaturated monomers other than acrylic monomers. Ethylenically unsaturated monomers other than said acrylic unsaturated monomers can include, for example, those monomeric materials exhibiting ethylenic double bond unsaturation such as polymerizable vinyl, allylic, fumaric, maleic, or like ethylenically unsaturated double bond functionality (carbon-to-carbon unsaturation) which can be copolymerized with the acrylic double bond unsaturation in said acrylic unsaturated monomers. Ethylenically unsaturated monomers can include, for example, styrene, alpha-methyl styrene and substituted alkyl styrenes, chlorostyrene, vinyl toluene, vinyl naphthalene, dibutyl maleate, butadiene, vinyl chloride, vinylidene chloride, acrylamide and acrylonitrile and similar ethylenically unsaturated monomers. The ethylenically unsaturated monomers can be copolymerized with said monomers containing acrylic unsaturation by free radical induced addition polymerization using peroxy or azo catalysts, common redox catalysts, ultraviolet radiation, or the like. The acrylic copolymer of this invention can be synthesized by adding a monomer mixture over a period of time to an aqueous polymerization medium in the presence of a free radical initiator or azo catalyst to produce an acrylic latex copolymer. Ordinarily about 1-2% peroxide initiators based on the monomer weight is used in the polymerization of monomers.

Referring next to the glass microballoons, the microballoons are powdery in appearance having a particle size predominantly less than about 130 microns and an average size of less than 100 microns. The glass microballoons are tiny, hollow glass bubbles wherein the wall thickness is generally between 0.5 to 2 microns and consequently exhibiting a bulk density approximately between 0.1 and 0.4 grams per cubic centimeter or a specific gravity between about 0.14 and 0.38. Preferably the glass microballoons contain continuous surphaces, although the glass particles can contain vesiculated surfaces. Since the glass microballoons are substantially spherical, the microballoons advantageously become aligned in a close packing arrangement when dispersed in the latex acrylic binder to provide high volume packing of filler. The close packing of the hollow glass beads provides excellent insulation properties to the dried caulk barrier in use. The oil absorption of the glass microballoons is very low, typically between 31-36 grams of oil per 100 cubic centimeters of microballoons which is considerably lower than typical mineral fillers. The low oil absorption of the microballoons advantageously enables the use of increased amounts of microballoons with less acrylic binder, thereby further contributing to increase insulation value and low shrink in use, as well as good extruding characteristic during application.

Referring now to a suitable method for compounding the caulk in accordance with this invention, the acrylic copolymer latex binder can be advantageously premixed with additives other than the glass microballoons in a paddle mixer or the like to provide a uniform premix. Additives such as plasticizer, solvent, water adhesion promoters, mineral fillers and/or coloring pigments can be premixed with the acrylic latex. Plasticizers can include polymeric polyester, dibutyl phthalate di(2-ethyl hexyl) azelate, dipropylene glycol dibenzoate, diethylene glycol dibenzoate, tributyl phosphate, tricresyl phosphate, cresyl diphenyl phosphate, 2-ethyl hexyl diphenyl phosphate, butyl benzyl phthalate, N-ethyl, o-toluene sulfonamide. Solvents can include petroleum solvent, petroleum aliphatic solvent, 2,2,4-trimethyl-1, 3 pentanediol monoisobutyrate. Adhesion promoters can include gamma amino propyl triethoxy silane, gamma amino propyl trimethoxy silane, N-beta-(amino ethyl)-gamma amino propyl trimethoxy silane, triamino functional silane, amino alkyl silicone solution, beta-(3,4-epoxy cyclohexyl) ethyl trimethoxy silane, gamma-glycidoxy propyl trimethoxy silane, gamma-mercapto propyl trimethoxy silane, gamma-methacryloxy propyl trimethoxy silane, vinyl triethoxy silane vinyl-tris(2-methoxy ethoxy silane). A common filler is titanium dioxide. These additives can be mixed with acrylic latex whereupon glass microballoons can then be added to the premix to produce a caulk having the right consistency for a pliable caulk material. Advantageously the acrylic binder to microballoon ratio on a weight basis can be between about 40% to 75% acrylic binder with 25% to 60% microballoons.

The merits of the caulk of this invention are further illustrated in the following examples.

EXAMPLE 1

The following components were mixed together in a paddle mixer except for the glass microballoons to form a premix. Thereafter the microballoons were added to the premix until a pliable uniform caulk material resulted.

| Raw Material | Lbs. | Gallons |
| --- | --- | --- |
| Acrylic Latex | 298.43 | 33.16 |
| Ammonium salt of carboxylated polyelectrolyte | 3.96 | .42 |
| 1-(3-chloroallyl)-3,5,7-triaza-1-azoniaadamantane | .66 | .05 |
| 2(Thiocyanomethylthio)-benzothiazole | .33 | .03 |
| Colloid anti-foamer | 5.28 | .68 |
| Octyl phenoxy polyethoxy ethanol | 6.60 | .71 |
| Methanol | 15.85 | 2.40 |
| Dipropylene clycol dibenzoate | 46.22 | 4.91 |
| Glycidoxy-propyl methylcellulose | .66 | .08 |
| Glass Bubbles | 99.03 | 54.11 |
| Methocel | .43 | .09 |
| Mineral Spirits | 3.96 | .61 |
| Water | 26.41 | 3.17 |
|  | 504.75 | 99.99 |

The resulting caulk was a firm but flexible caulking exhibiting excellent insulating and sealing properties was tested as a sealing barrier. The set caulk exhibited an insulating "R-value" of 1.7 per inch of caulk, good extrudability at low temperatures, desirable adhesion to common building materials, and volume shrinkage of less than 5%, and a lightweight per gallon of about 5 pounds/gallon.

I claim:
1. A low shrink lightweight caulk for sealing structural joints containing binder, plasticizer, filler, adhesion promoter, and other caulk additives, wherein the improvement comprises:
   40% to 75% by weight of an acrylic copolymer latex binder
   25% to 60% by weight of glass microballoon powder having a predominant particle size less than about 130 microns.
2. The caulk of claim 1 wherein the microballoon particles have an average size less than about 100 microns.

* * * * *